United States Patent
Nakanishi

(10) Patent No.: US 8,162,499 B2
(45) Date of Patent: Apr. 24, 2012

(54) BACKLIGHT UNIT, ELECTRO-OPTICAL DEVICE, AND ELECTRONIC APPARATUS

(75) Inventor: Daisuke Nakanishi, Matsumoto (JP)

(73) Assignee: Epson Imaging Devices Corporation, Nagano (JP)

( * ) Notice: Subject to any disclaimer, the term of this patent is extended or adjusted under 35 U.S.C. 154(b) by 297 days.

(21) Appl. No.: 12/473,761

(22) Filed: May 28, 2009

(65) Prior Publication Data

US 2010/0027243 A1    Feb. 4, 2010

(30) Foreign Application Priority Data

Aug. 1, 2008   (JP) ................................. 2008-199330

(51) Int. Cl.
*F21V 9/14* (2006.01)
(52) U.S. Cl. ...... 362/97.1; 362/97.3; 362/613; 362/603; 362/609
(58) Field of Classification Search ........ 362/97.1–97.4, 362/600, 603, 609, 633, 634, 612, 614
See application file for complete search history.

(56) References Cited

U.S. PATENT DOCUMENTS

| | | | | |
|---|---|---|---|---|
| 5,664,873 | A * | 9/1997 | Kanda et al. | 362/97.1 |
| 7,283,118 | B2 | 10/2007 | Nagatani | |
| 7,510,314 | B2 | 3/2009 | Arai et al. | |
| 7,600,908 | B2 * | 10/2009 | Chang et al. | 362/623 |
| 7,766,529 | B2 * | 8/2010 | Hadlich et al. | 362/612 |
| 7,905,616 | B2 * | 3/2011 | Konno et al. | 362/97.1 |
| 7,967,460 | B2 * | 6/2011 | Yun et al. | 362/97.1 |
| 2008/0174543 | A1 | 7/2008 | Nagatani | |
| 2009/0046446 | A1 | 2/2009 | Kamada et al. | |
| 2009/0268434 | A1 * | 10/2009 | Mita et al. | 362/97.1 |
| 2010/0027241 | A1 * | 2/2010 | Nakanishi | 362/97.1 |
| 2010/0110332 | A1 * | 5/2010 | Kamada | 349/62 |
| 2011/0013377 | A1 * | 1/2011 | Kim | 362/97.1 |

FOREIGN PATENT DOCUMENTS

| | | |
|---|---|---|
| JP | 2003162901 | 6/2003 |
| JP | 2006-128129 A | 5/2006 |
| JP | 2006-244990 A | 9/2006 |
| JP | 2007-080798 A | 3/2007 |
| JP | 3132744 | 6/2007 |
| JP | 2008071560 | 3/2008 |
| JP | 2008166291 | 7/2008 |
| WO | 2006019077 | 2/2006 |
| WO | 2007037047 | 4/2007 |

\* cited by examiner

*Primary Examiner* — Anabel Ton
(74) *Attorney, Agent, or Firm* — Lowe, Hauptman, Ham & Berner, LLP

(57) ABSTRACT

A backlight unit includes: an arrangement surface on which a plurality of light sources are arranged; a plurality of reflection surfaces which are erected from a plurality of edges of the arrangement surface and reflect a light from the plurality of light sources, wherein the light emitted from the light sources and the light reflected from the plurality of reflection surfaces irradiate to an irradiation area surrounded by the plurality of reflection surfaces; the plurality of reflection surfaces are each inclined at an inclination angle smaller than 90 degrees with respect to extension surface of the arrangement surface which extends toward the outside of the reflection surface; at least one reflection surface of the plurality of reflection surfaces includes a large inclination area inclined at a large inclination angle and a small inclination area inclined at a small inclination angle; and the light source arranged close to the large inclination area is disposed closer to the outside frame of the irradiation area than the other light sources arranged close to the small inclination area in plan view from the irradiation area.

11 Claims, 5 Drawing Sheets

SMALL INCLINATION ANGLE

LARGE INCLINATION ANGLE

BACKLIGHT UNIT, ELECTRO-OPTICAL DEVICE, AND ELECTRONIC APPARATUS

BACKGROUND

1. Technical Field

The present invention relates to a backlight unit including a plurality of light sources, and an electro-optical device and an electronic apparatus using the backlight unit.

2. Related Art

In the related art, a liquid crystal display device (LCD) as an electro-optical device includes a display panel displaying an image and a backlight unit disposed on the rear surface of the display panel and emitting light toward the display panel.

As the backlight unit, a direct-type backlight unit having a plurality of light sources arranged directly below the display panel has been known (for example, see JP-A-2007-80798).

The direct-type backlight unit disclosed in JP-A-2007-80798 includes a box-like case having a bottom plate, a plurality of light sources arranged inside the case, and a display panel disposed so as to cover an opening of the case. The case has the bottom plate and a plurality of side walls obliquely erected from the edges of the bottom plate. The plurality of light sources are arranged on the bottom plate in a zigzag shape. In addition, the plurality of side walls are erected at the same inclination angle.

Light emitted from the plurality of light sources and light reflected from inner surfaces (reflection surfaces) of the plurality of side walls irradiate to an irradiation area surrounded by the upper ends of the plurality of side walls.

In the backlight unit disclosed in JP-A-2007-80798, however, since the plurality of light sources are arranged in a zigzag shape, the light sources distant from the side walls and the light sources close to the side walls exist. Therefore, in the light sources distant from the side walls, an amount of light reflected from the reflection surfaces of the side walls is reduced. In contrast, in the light sources close to the side walls, an amount of light reflected from the reflection surfaces of the side walls is increased. For this reason, a problem may occur in that an amount of light in the irradiation area becomes non-uniform. Moreover, the amount of light reflected from the reflection surfaces of the side walls is reduced in the light sources distant from the side walls. Therefore, a problem may occur in that an amount of light emitted to a side of the outside frame of the irradiation area is reduced, thereby deteriorating optical characteristics.

On the other hand, in a liquid crystal display device which is an assembly of the backlight unit and the display panel, when the amount of light in the irradiation area of the backlight unit is not uniform, a problem may occur in that display irregularities such as brightness irregularity and color irregularity occurs in an effective display area where an image of the display panel is displayed.

SUMMARY

An advantage of some aspects of the invention is that it provides a backlight unit capable of allowing an amount of light in the entire irradiation area to be uniform to improve optical characteristics, effectively using light from a light source to realize lower power consumption, and being used for a bright illuminating device, and an electro-optical device and an electronic apparatus capable of suppressing display irregularities in an effective display area.

According to an aspect of the invention, there is provided a backlight unit including: an arrangement surface on which a plurality of light sources are arranged; and a plurality of reflection surfaces which are erected from a plurality of edges of the arrangement surface and reflect a light from the plurality of light sources. The light emitted from the light sources and the light reflected from the plurality of reflection surfaces irradiate to an irradiation area surrounded by the plurality of reflection surfaces. The plurality of reflection surfaces are each inclined at an inclination angle smaller than 90 degrees with respect to extension surface of the arrangement surface which extends toward the outside of the reflection surface. At least one reflection surface of the plurality of reflection surfaces includes a large inclination area inclined at a large inclination angle and a small inclination area inclined at a small inclination angle. In plan view from the irradiation area, the light source arranged close to the large inclination area is disposed closer to the outside frame of the irradiation area than the other light sources arranged close to the small inclination area.

With such a configuration, in the small inclination area, the light incident from the light sources arranged at the positions distant from each other is reflected at the large reflection angle and output to the outside frame of the irradiation area. Accordingly, the amount of light output to the outside frame of the irradiation area is not reduced. In addition, in the large inclination area, the light incident from the light sources close to the large inclination area is reflected at a small reflection angle to supplement an area where the amount of light in the irradiation area is reduced. Accordingly, since the amount of light in the entire irradiation area is uniform, the bright backlight unit improved in optical characteristics to realize low power consumption can be provided.

According to another aspect of the invention, there is provided a backlight unit including: an arrangement surface on which a plurality of light sources are arranged; and a plurality of reflection surfaces which are erected from a plurality of edges of the arrangement surface and reflect a light from the plurality of light sources. The light emitted from the light sources and the light reflected from the plurality of reflection surfaces irradiate to an irradiation area surrounded by the plurality of reflection surfaces. The plurality of reflection surfaces are each inclined at an inclination angle smaller than 90 degrees with respect to extension surface of the arrangement surface which extends toward the outside of the reflection surface. At least one reflection surface of the plurality of reflection surfaces includes a large inclination area inclined at a large inclination angle and a small inclination area inclined at a small inclination angle. The large inclination area is provided at a position to which a larger amount of light is emitted from the light sources and the small inclination area is provided at a position to which a smaller amount of light is emitted from the light sources.

With such a configuration, since the light from the large inclination area supplements the area where the amount of light in the irradiation area is reduced and the light from the small inclination area is output to the outside frame of the irradiation area, the amount of light output to the outside frame of the irradiation area is not reduced. Accordingly, since the amount of light in the entire irradiation area is uniform, the bright backlight unit improved in optical characteristics to realize low power consumption can be provided.

In the backlight unit according to this aspect of the invention, the reflection surface may be formed in a surface which continuously connects the large inclination area and the small inclination area.

The backlight unit according to the above aspect of the invention may further include a case which includes a bottom plate and a plurality of side walls erected from edges of the bottom plate. The arrangement surface on which the plurality of light sources are arranged is placed on an inner surface of the bottom plate. The plurality of reflection surfaces from which the light emitted from the plurality of light sources is reflected are arranged on inner surfaces of the plurality of side walls.

The backlight unit according to the above aspect of the invention may further include a case which includes a bottom plate and a plurality of side walls erected from edges of the bottom plate. The bottom plate is the arrangement surface on which the plurality of light sources are arranged. The plurality of reflection surfaces on which the light emitted from the plurality of light sources is reflected are arranged on inner surfaces of the plurality of side walls.

In the backlight unit according to this aspect of the invention, a space may be formed between the outside of the small inclination area and the inside of the side wall.

With such a configuration, the large space is present between the outside of the small inclination area and the inside of the side wall. Accordingly, it is possible to make effective use of the space.

In the backlight unit according to this aspect of the invention, an electronic component may be provided in the space.

With such a configuration, the size of the backlight unit can be designed to be reduced.

In the backlight unit according to this aspect of the invention, a direction of the peak of the amount of light emitted from the light sources may be inclined at an angle from 50 degrees to 80 degrees with respect to a front direction of the light sources. With such a configuration, the light is effectively reflected toward the irradiation area from the plurality of reflection surfaces in that the direction of the peak of the amount of light emitted from the light sources is inclined at the angle from 50 degrees to 80 degrees with respect to the front direction of the light sources. Accordingly, the backlight unit further improved in the optical characteristics can be provided.

According to still another aspect of the invention, there is provided an electro-optical device including the backlight unit having the above-described configuration and a display panel which is disposed to overlap with the irradiation area of the backlight unit. The display panel includes an effective display area for displaying an image. In plan view from the irradiation area, an outside frame of the effective display area overlaps with the plurality of reflection surfaces of the backlight unit. Moreover, the effective display area may be provided within the irradiation area.

With such a configuration, a uniform amount of light emitted toward the irradiation area of the backlight unit is surely output to the outside frame of the effective display area of the display panel. Accordingly, by suppressing the display irregularities in the effective display area, an image having high quality and high brightness can be displayed.

According to still another aspect of the invention, there is provided an electronic apparatus comprising the electro-optical device having the above-described configuration. With such a configuration, it is possible to provide the electronic apparatus including a display device capable of displaying an image having high quality and high brightness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments (hereinafter, also referred to as embodiments) of the invention will be described in detail with reference to the drawings.

First Embodiment

Backlight Unit

Figure 1:
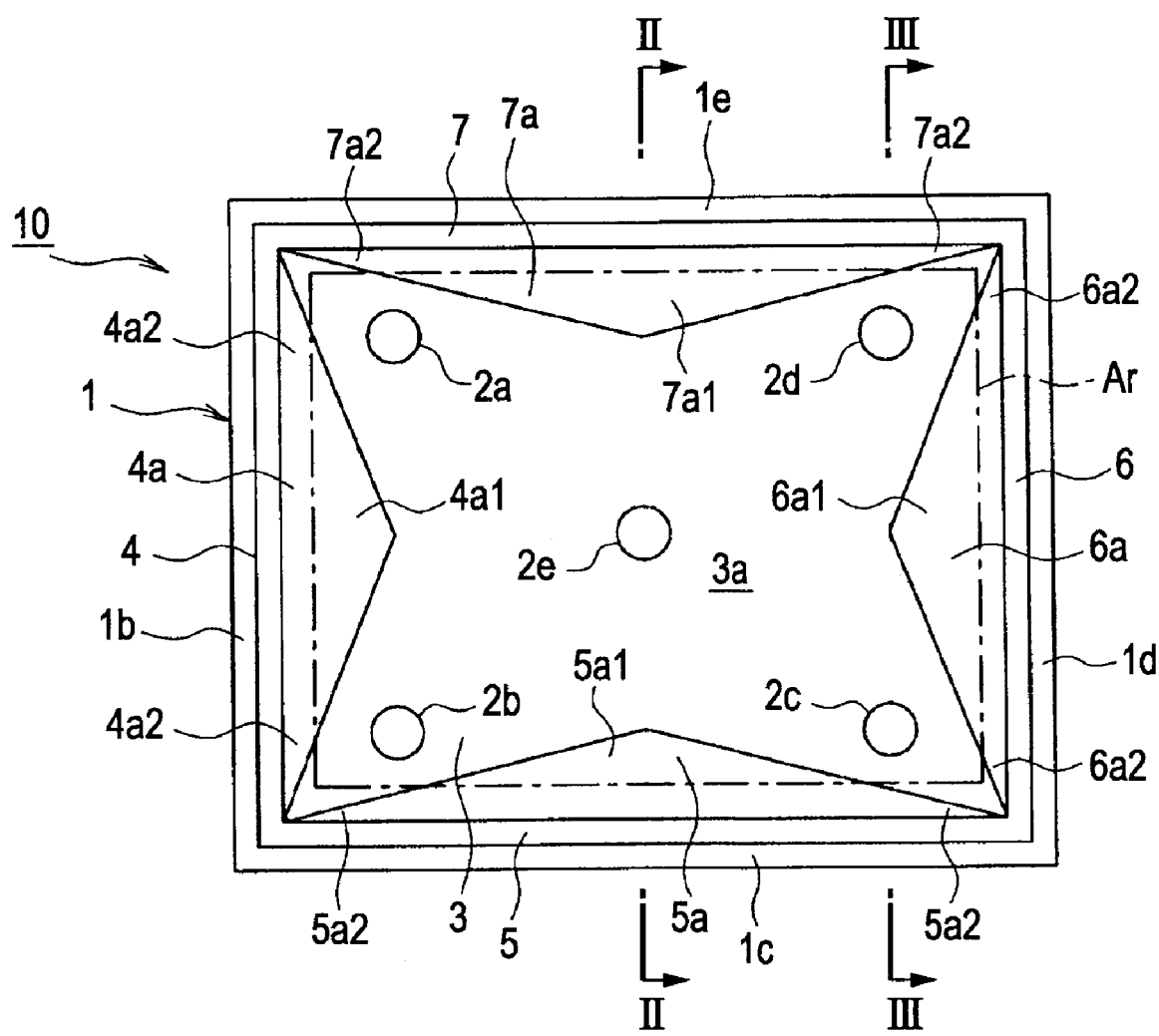
FIG. 1 is a top view illustrating a backlight unit according to a first embodiment of the invention.
Figure 2:
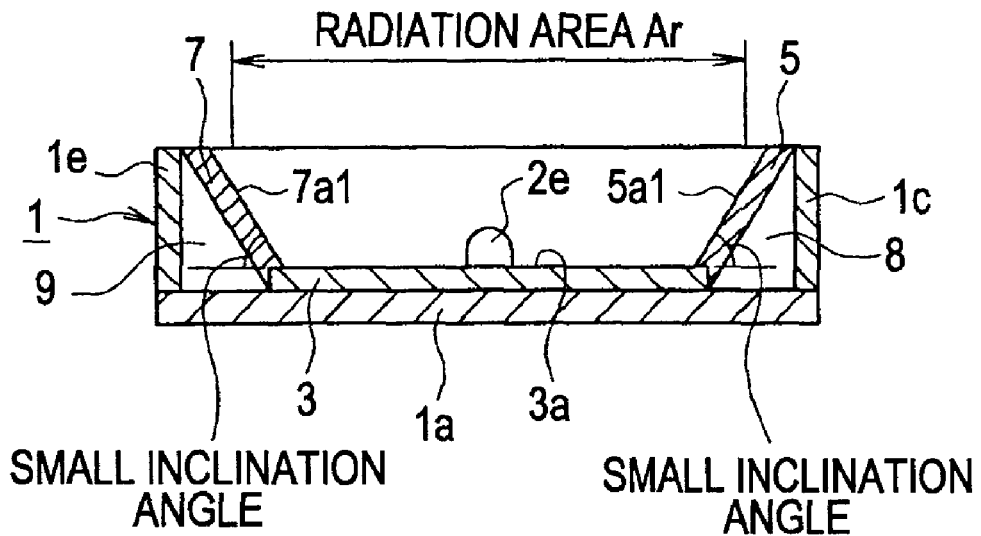
FIG. 2 is a sectional view taken along the line II-II of FIG. 1.
Figure 3:
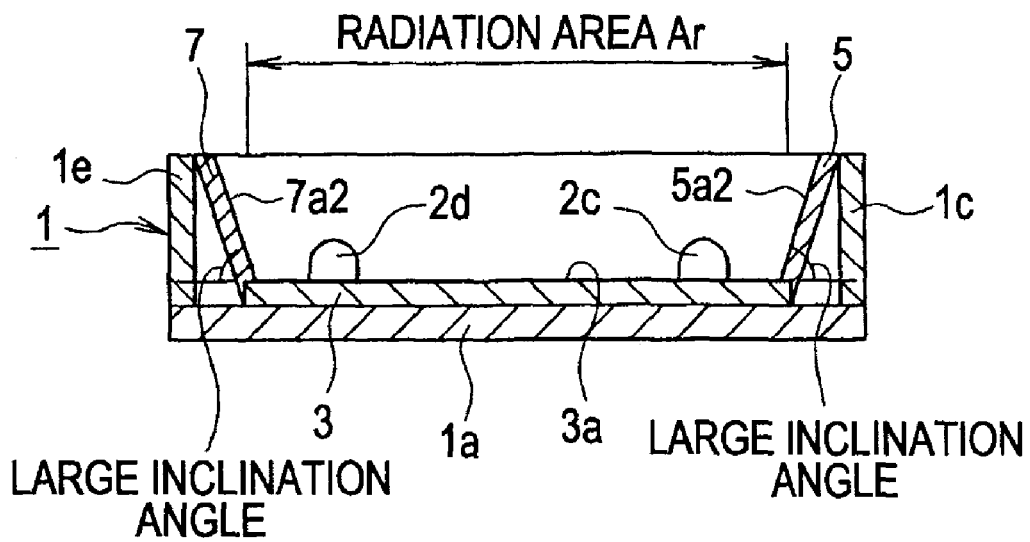
FIG. 3 is a sectional view taken along the line III-III of FIG. 1.
Figure 4A:
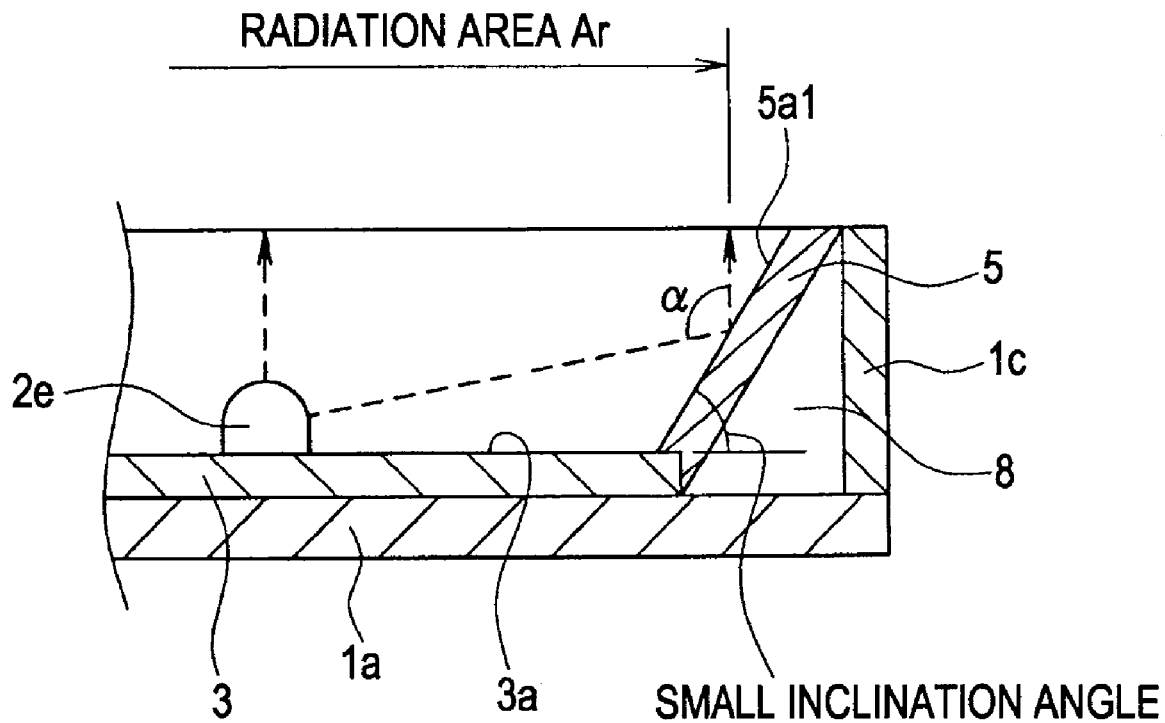
FIGS. 4A and 4B are enlarged views illustrating major units of FIGS. 2 and 3, respectively.
Figure 4B:
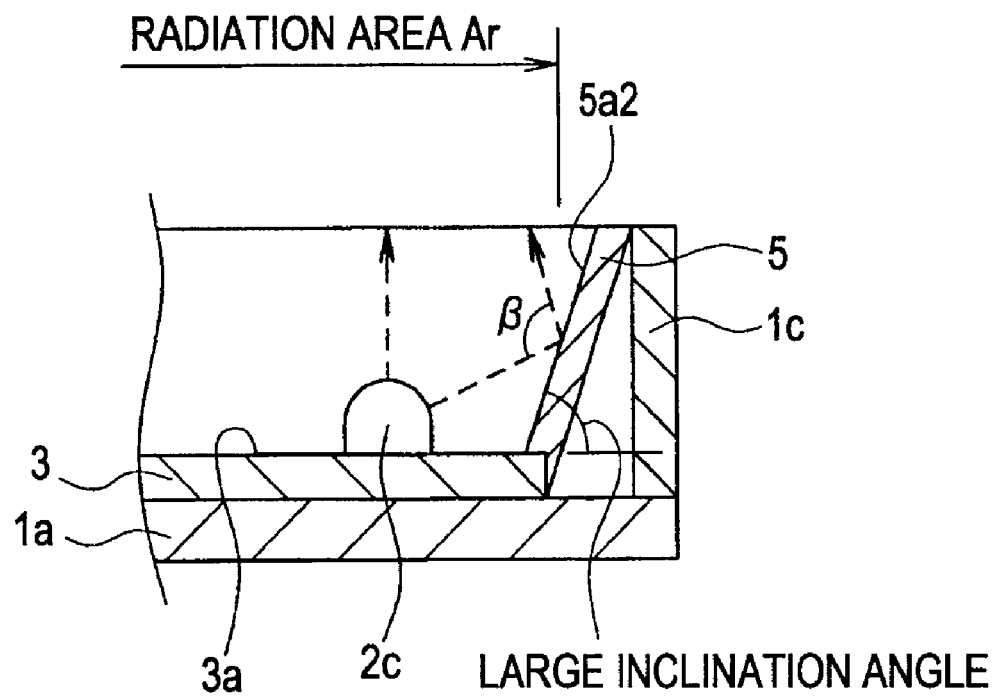

FIG. 1 is a top view illustrating a backlight unit according to the invention. FIG. 2 is a sectional view taken along the line II-II of FIG. 1. FIG. 3 is a sectional view taken along the line III-III of FIG. 1. FIG. 4A is an enlarged view illustrating major units of FIG. 2. FIG. 4B is an enlarged view illustrating major units of FIG. 3.

A backlight unit 10 according to this embodiment includes a box-like case 1 having a bottom plate and a plurality of light sources 2a to 2e arranged in a predetermined arrangement manner inside the case 1.

The case 1 includes a bottom plate 1a and a plurality of side walls 1b to 1e erected from the edges of the bottom plate 1a. An arrangement plate 3 is placed on the bottom plate 1a. In addition, a plurality of light sources 2 are arranged on an arrangement surface 3a of the arrangement plate 3 and inclination walls 4 to 7 are arranged between the edges of the arrangement plate 3 and the upper edges of the side walls 1b to 1e.

Light sources 2a to 2d among the plurality of light sources 2a to 2e are arranged in the vicinity of four corners of the arrangement surface 3a and the remaining light source 2e is arranged at the center (the center of the arrangement surface 3a) of an area binding the light sources 2a to 2d.

The light sources 2a to 2e are members which each include a light-emitting element such as an LED (Light-Emitting Diode) and an optical member such as a convex lens which is disposed at a light output position of the light-emitting element and formed of a material such as resin. The optical member is capable of outputting more light emitted from the light-emitting element in a direction intersecting a front direction than in the front direction. The plurality of light sources 2a to 2e according to this embodiment is a light source which emits light so that a direction of the peak of the amount of light emitted is inclined at an angle from 50 degrees to 80 degrees with respect to the front direction of the light source.

Inner surfaces 4a to 7a of the inclination walls 4 to 7 are each configured as an inclination surface which is inclined at an inclination angle smaller than 90 degrees with respect to an extension surface of the arrangement surface 3a extends toward the outside of the inner surfaces. The inner surfaces 4a to 7a are reflection surfaces (hereinafter, referred to as reflection surfaces 4a to 7a) from which light emitted from the light sources 2a to 2e is reflected. In addition, light emitted from the plurality of light sources 2a to 2e and light emitted from the reflection surfaces 4a to 7a irradiate toward an opening surrounded by the reflection surfaces 4a to 7a.

The reflection surface 7a of the side wall 7 is a surface which continuously connects a small inclination area 7a1 inclined at a small inclination angle and large inclination areas 7a2 inclined at a large inclination angle.

That is, the small inclination area 7a1 inclined at the small inclination angle is formed at a position distant from the light source 2e in the middle portion in a longitudinal direction of the reflection surface 7a (see FIG. 2). The large inclination areas 7a2 inclined at the large inclination angle are formed at positions which are on both ends in the longitudinal direction of the reflection surface 7a and close to the light sources 2a and 2d so that the inclination angle thereof is gradually changed toward the both ends in the longitudinal direction from the small inclination area 7a1 (see FIG. 3).

The reflection surface 5a of the side wall 5 is also a surface in which a small inclination area 5a1 inclined at a small inclination angle is formed at a position distant from the light source 2e in the middle portion in a longitudinal direction of the reflection surface 5a (see FIG. 2) and large inclination areas 5a2 inclined at a large inclination angle are formed at positions which are in both ends in the longitudinal direction of the reflection surface 5a and close to the light sources 2b and 2c so that the inclination angle thereof is gradually changed toward the both ends in the longitudinal direction (see FIG. 3).

The reflection surface 4a of the side wall 4 is also a surface in which a small inclination area 4a1 inclined at a small inclination angle is formed at a position distant from the light source 2e in the middle portion in a longitudinal direction of the reflection surface 4a and large inclination areas 4a2 inclined at a large inclination angle are formed at positions which are in both ends in the longitudinal direction of the reflection surface 4a and close to the light sources 2a and 2b so that the inclination angle thereof is gradually changed toward the both ends in the longitudinal direction. Moreover, The reflection surface 6a of the side wall 6 is also a surface in which a small inclination area 6a1 inclined at a small inclination angle is formed at a position distant from the light source 2e in the middle portion in a longitudinal direction of the reflection surface 6a and large inclination areas 6a2 inclined at a large inclination angle is formed at positions which are in both ends in the longitudinal direction of the reflection surface 6a and close to the light sources 2c and 2d so that the inclination angle thereof is gradually changed toward the both ends in the longitudinal direction.

That is, in all the side walls, the small inclination area and the large inclination areas are connected as a continuous surface.

As shown in FIG. 2, the case 1 is provided with large spatial portions on sides of the rear surfaces of the small inclination areas 7a1 and 5a1 inclined at the small inclination angle. In the spatial portions, spaces 8 and 9 capable of accommodating an electronic component such as a control unit controlling the light sources 2 of the backlight unit 10 are formed. Even though not illustrated, large spatial portions are provided on sides of the rear surfaces of the small inclination areas 4a1 and 6a1 inclined at the small inclination angle. In the spatial portions, spaces capable of accommodating an electronic component are formed.

When the plurality of light sources 2a to 2e of the backlight unit 10 according to this embodiment emit light, the light emitted from the plurality of light sources 2a to 2e and light emitted from the light sources 2a to 2e and reflected from the reflection surfaces 4a to 7a are incident on the opening surrounded by the outer ends of the reflection surfaces 4a to 7a, that is, are incident on a irradiation area Ar having a large area shown in FIG. 1.

In this embodiment, as shown in FIG. 4A, the small inclination area 5a1 inclined at the small inclination angle is formed at the position distant from the light sources 2e disposed in the middle portion of the arrangement surface 3a. With such a configuration, since in the small inclination area 5a1, the light incident from the light source 2e is reflected at a large inclination angle α and output to the outside frame of the irradiation area Ar, an amount of light output to the outside frame of the irradiation area Ar is not reduced. Likewise, the small inclination areas 4a1, 6a1, and 7a1 are also formed at the positions distant from the light source 2e disposed in the middle portion of the arrangement surface 3a.

As shown in FIG. 4B, the large inclination area 5a2 inclined at the large inclination area is formed at a position close to the light source 2c disposed in the corner of the arrangement surface 3a. Likewise, the large inclination areas 4a2, 6a2, and 7a2 are also formed at positions close to the light sources 2a, 2b, and 2d disposed in the corners of the arrangement surface 3a, respectively.

In this way, the light sources 2a to 2d disposed close to the large inclination areas 4a2, 5a2, 6a2, and 7a2 are arranged closer to the outside frame of the irradiation area Ar than the light source 2e disposed close to the small inclination areas 4a1, 5a1, 6a1, and 7a1 in plan view from the irradiation area Ar. With such a configuration, since in the small inclination areas 4a1, 5a1, 6a1, and 7a1, the light incident from the light source 2e is reflected at the large inclination angle α and output to the outside frame of the irradiation area Ar, the amount of light output to the outside frame of the irradiation area Ar is not reduced. Moreover, by reflecting the light incident from the light sources 2a to 2d at a small reflection angle β in the large inclination areas 4a2, 5a2, 6a2, and 7a2, an area where the amount of light in the irradiation area Ar is reduced is supplemented.

Even when the light source 2e is disposed at the position distant from the reflection surfaces 4a to 7a and the light sources 2a to 2d are disposed close to the reflection surfaces 4a to 7a in the arrangement surface 3a of the case 1, the amount of light output toward the outside frame of the irradiation area Ar is not reduced and the amount of light is uniform in the entire irradiation area Ar. Accordingly, the backlight unit 10 improved in optical characteristics can be provided.

The light sources 2a to 2e according to this embodiment emit light such that the direction of the peak of the amount of light emitted is inclined at the angle from 50 degrees to 80 degrees with respect to the front direction of the light sources. With such a configuration, since the light emitted from the light sources 2a to 2e is effectively reflected toward the irradiation area Ar from the reflection surfaces 4a to 7a and output to the outside frame of the irradiation area Ar, brightness in the outside frame of the irradiation area Ar is improved. Accordingly, the backlight unit 10 further improved in optical characteristics can be provided.

In the backlight unit 10 according to this embodiment, it is possible to make effective use of the spaces 8 and 9 by accommodating electronic components in the spaces 8 and 9 formed in the rear surfaces of the small inclination areas 4a1, 5a1, 6a1, and 7a1.

In this embodiment, the five light sources 2a to 2e are disposed, but does not limit the gist of the invention. The same advantages can be obtained by arranging several light sources in a zigzag shape and allowing the light sources arranged close to the large inclination areas to be disposed closer to the outside frame of the irradiation area than the light sources arranged close to the small inclination areas in plan view from the irradiation area Ar.

Second Embodiment

Backlight Unit

Figure 5:
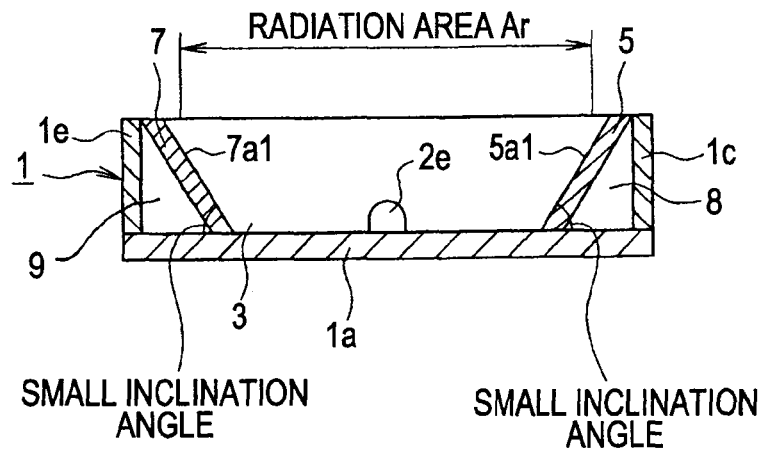
FIG. 5 is a sectional view illustrating a backlight unit according to a second embodiment of the invention.

FIG. 5 is a sectional view illustrating a backlight unit according to a second embodiment of the invention.

In a backlight unit 10 according to this embodiment, the arrangement plate 3 is not placed on a bottom plate 1a of a case 1 and a plurality of light sources 2a to 2e are arranged on the upper surface of the bottom plate 1a.

The shape of the respective reflection surfaces 4a to 7a is the same as that according to the first embodiment. In plan view from the irradiation area Ar, the light sources 2a to 2d arranged close to the large inclination areas 4a2, 5a2, 6a2, and 7a2 are disposed closer to the outside frame of the irradiation area Ar than the light source 2e arranged close to the small inclination areas 4a1, 5a1, 6a1, and 7a1.

The arrangement surface of the invention corresponds to the upper surface of the bottom plate 1a.

According to this embodiment, the same advantages of the first embodiment can be obtained. Moreover, since the arrangement plate 3 is not placed on the bottom plate 1a of the case 1, the number of constituent elements can be reduced.

Third Embodiment

Liquid Crystal Display Device

Next, a liquid crystal display device as an electro-optical device of the invention using the backlight unit 10 having the above-described configuration will be described.

Figure 6:
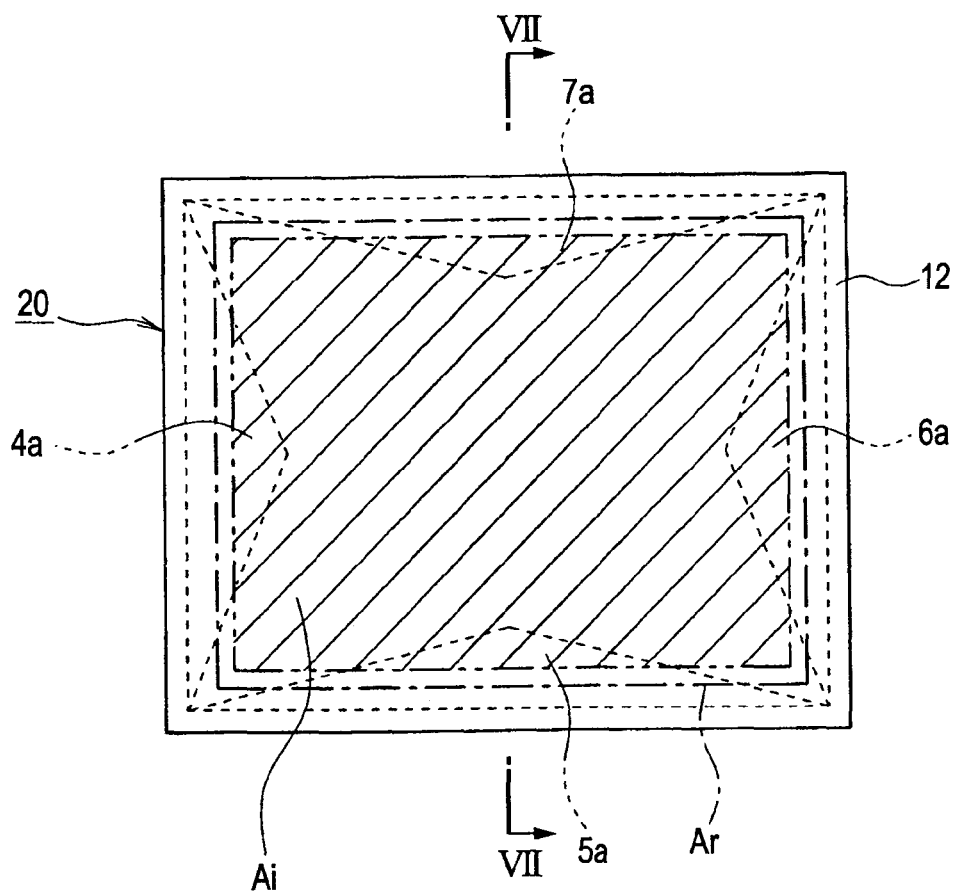
FIG. 6 is a top view illustrating an electro-optical device according to a third embodiment of the invention.
Figure 7:
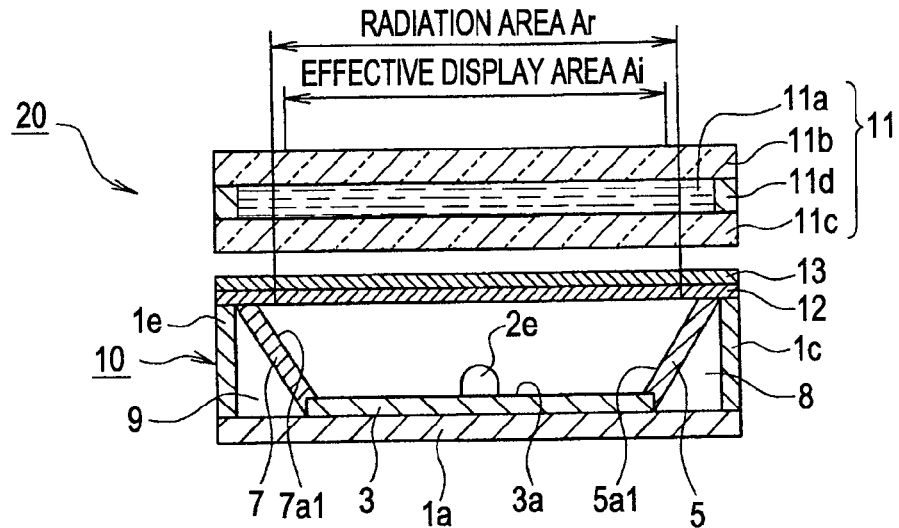
FIG. 7 is a sectional view taken along the line VII-VII of FIG. 6.

FIG. 6 is a top view illustrating the liquid crystal display device. FIG. 7 is a sectional view taken along the line VII-VII of FIG. 6.

According to this embodiment, a liquid crystal display device 20 includes a liquid crystal display panel 11, a diffusion plate 12, an optical sheet 13, and a liquid crystal driving IC (not shown) formed on the backlight unit 10 according to the first embodiment.

The liquid crystal display panel 11 includes a front surface substrate 11b and a rear surface substrate 11c opposed to each other with a liquid crystal layer 11a interposed therebetween, and also includes a seal material 11d formed in a frame shape between the circumference of the two substrates to adhere the two substrates. The front surface substrate 11b has a configuration in which a liquid crystal alignment control layer having a front surface electrode made of a transparent conductive material, an alignment film, or the like is formed on a surface close to the liquid crystal layer of a substrate body as a transparent substrate. The rear surface substrate 11c also has a configuration in which a liquid crystal alignment control layer having a rear surface electrode made of a transparent conductive material, an alignment film, or the like is formed on a surface close to the liquid crystal layer of a substrate body as a transparent substrate. In addition, a protrusion portion is provided in one of the front surface substrate 11b and the rear surface substrate 11c so as to protrude toward the outer circumference of the other thereof. A wiring pattern is formed on the protrusion portion. The front surface electrode of the front surface substrate 11b and the rear surface electrode of the rear surface substrate 11c are electrically connected to the wiring pattern formed on the protrusion portion. In addition, the liquid crystal driving IC electrically driving the liquid crystal display panel 11 is mounted on the wiring pattern formed on the protrusion portion.

The diffusion plate 12, the optical sheet 13, and the liquid crystal display panel 11 are laminated on the backlight unit 10.

The liquid crystal display panel 11 is provided with an effective display area Ai which is an area for displaying an image.

In plan view of the liquid crystal display device 20, the outside frame of the effective display area Ai of the liquid crystal display panel 11 overlaps with the reflection surfaces 4a to 7a of the backlight unit 10. The effective display area Ai of the liquid crystal display panel 11 is formed within the irradiation area Ar of the backlight unit 10.

A display panel according to the invention corresponds to the liquid crystal display panel 11.

In the liquid crystal display device 20 according to this embodiment, the outside frame of the effective display area Ai of the liquid crystal display panel 11 overlaps with the reflection surfaces 4a to 7a of the backlight unit 10 in plan view. In addition, the light emitted from the plurality of light sources 2a to 2e of the backlight unit 10 and reflected from the reflection surfaces 4a to 7a surely irradiates to the outside frame of the effective display area Ai. Therefore, it is possible to prevent the occurrence of display irregularities, such as brightness irregularity and color irregularity, in the effective display area Ai.

According to this embodiment, since the effective display area Ai of the liquid crystal display panel 11 is provided within the irradiation area Ar of the backlight unit 10 in plan view of the liquid crystal display device 20, an amount of light emitted to the outside frame of the effective display area Ai is not reduced and the amount of light in the entire effective display area Ai is uniform. Accordingly, an image having high quality and high brightness can be displayed in the effective display area Ai.

Fourth Embodiment

Personal Computer

Figure 8:
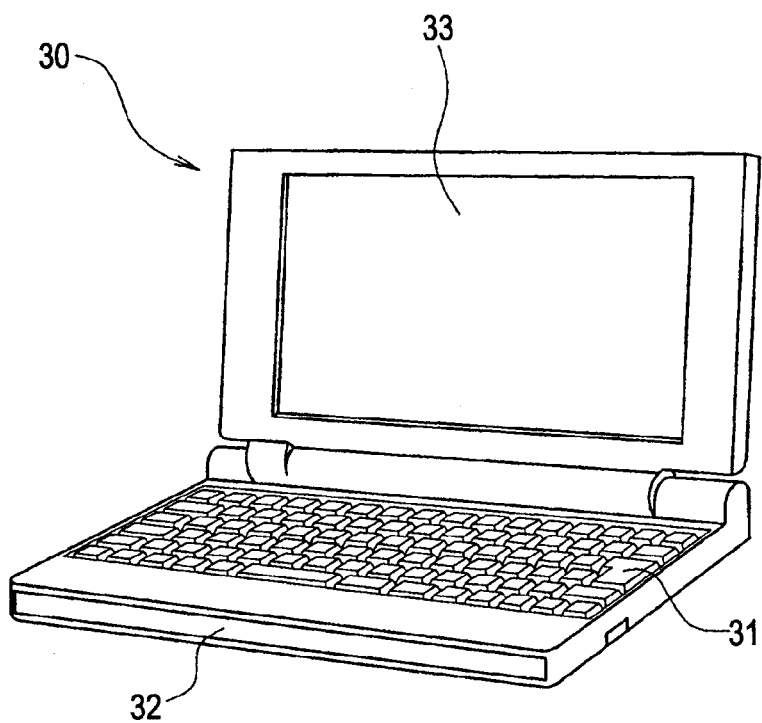
FIG. 8 is a perspective view illustrating an electronic apparatus according to a fourth embodiment of the invention.

Next, a personal computer as an electronic apparatus according to the invention using the liquid crystal display device 20 having the above configuration will be described.

a personal computer 30 shown in FIG. 8 includes a main body 32 having a keyboard 31 and a display device 33 to which the liquid crystal display device 20 is applied.

In the personal computer 30 according to this embodiment, the display device 33 displaying an image having high equality and high brightness can be provided.

The electronic apparatus according to the invention is not limited to the personal computer 30, but the invention is applicable to various electronic apparatuses. For example, the invention is applicable to a PDA (personal digital assistant), a small information electronic apparatus such as a palmtop computer, a mobile phone, an electronic book, a digital still camera, a liquid crystal television, a view finder type or monitor direct view type videotape recorder, a pager, an electronic organizer, an electronic calculator, a word processor, a workstation, a video phone, a POS terminal, a printing apparatus, and the like.

The entire disclosure of Japanese Patent Application No. 2008-199330, filed Aug. 1, 2008 is expressly incorporated by reference herein.

What is claimed is:

1. A backlight unit comprising:
   an arrangement surface on which a plurality of light sources are arranged; and
   a plurality of reflection surfaces which are erected from a plurality of edges of the arrangement surface and reflect a light from the plurality of light sources,
   wherein the light emitted from the light sources and the light reflected from the plurality of reflection surfaces irradiate to an irradiation area surrounded by the plurality of reflection surfaces;
   the plurality of reflection surfaces are each inclined at an inclination angle smaller than 90 degrees with respect to extension surface of the arrangement surface which extends toward the outside of the reflection surface;
   at least one reflection surface of the plurality of reflection surfaces includes a large inclination area inclined at a large inclination angle and a small inclination area inclined at a small inclination angle; and
   the light source arranged close to the large inclination area is disposed closer to the outside frame of the irradiation area than the other light sources arranged close to the small inclination area in plan view from the irradiation area.

2. A backlight unit comprising:
   an arrangement surface on which a plurality of light sources are arranged; and
   a plurality of reflection surfaces which are erected from a plurality of edges of the arrangement surface and reflect a light from the plurality of light sources,
   wherein the light emitted from the light sources and the light reflected from the plurality of reflection surfaces irradiate to an irradiation area surrounded by the plurality of reflection surfaces;
   the plurality of reflection surfaces are each inclined at an inclination angle smaller than 90 degrees with respect to extension surface of the arrangement surface which extends toward the outside of the reflection surface;
   at least one reflection surface of the plurality of reflection surfaces includes a large inclination area inclined at a large inclination angle and a small inclination area inclined at a small inclination angle; and
   the large inclination area is provided at a position to which a larger amount of light is emitted from the light sources and the small inclination area is provided at a position to which a smaller amount of light is emitted from the light sources.

3. The backlight unit according to claim 1, wherein the reflection surface is formed in a surface which continuously connects the large inclination area and the small inclination area.

4. The backlight unit according to claim 1, further comprising:
   a case which includes a bottom plate and a plurality of side walls erected from edges of the bottom plate,
   wherein the arrangement surface on which the plurality of light sources are arranged is placed on an inner surface of the bottom plate, and
   wherein the plurality of reflection surfaces from which the light emitted from the plurality of light sources is reflected are arranged on inner surfaces of the plurality of side walls.

5. The backlight unit according to claim 1, further comprising:
   a case which includes a bottom plate and a plurality of side walls erected from edges of the bottom plate,
   wherein the bottom plate is the arrangement surface on which the plurality of light sources are arranged, and
   wherein the plurality of reflection surfaces on which the light emitted from the plurality of light sources is reflected are arranged on inner surfaces of the plurality of side walls.

6. The backlight unit according to claim 4, wherein a space is formed between the outside of the small inclination area and the inside of the side wall.

7. The backlight unit according to claim 6, wherein an electronic component is provided in the space.

8. The backlight unit according to claim 1, wherein a direction of the peak of the amount of light emitted from the light sources is inclined at an angle from 50 degrees to 80 degrees with respect to a front direction of the light sources.

9. An electro-optical device comprising:
   the backlight unit according to claim 1; and
   a display panel which is disposed to overlap with the irradiation area of the backlight unit,
   wherein the display panel includes an effective display area for displaying an image, and
   wherein in plan view from the irradiation area, an outside frame of the effective display area overlaps with the plurality of reflection area of the backlight unit.

10. The electro-optical device according to claim 9, wherein the effective display area is provided within the irradiation area.

11. An electronic apparatus comprising the electro-optical device according to claim 9.

* * * * *